United States Patent [19]

Bernd et al.

[11] Patent Number: 5,019,734

[45] Date of Patent: May 28, 1991

[54] BRAKE COUPLER FOR DISPLACEMENT-TYPE ARMATURE MOTOR

[75] Inventors: Alfred Bernd, Herdecke; Willi England, Wetter; Heinz Flaig, Bochum; Wilhelm Hesse, Hattingen; Roland Staggl, Wetter; Karl Zacharias, Schwerte, all of Fed. Rep. of Germany

[73] Assignee: Mannesmann Aktiengesellschaft, Düsseldorf, Fed. Rep. of Germany

[21] Appl. No.: 496,782

[22] Filed: Mar. 21, 1990

[30] Foreign Application Priority Data

Mar. 21, 1989 [DE] Fed. Rep. of Germany ....... 3909771

[51] Int. Cl.$^5$ .................. H02K 7/06; H02K 17/32
[52] U.S. Cl. .................. 310/77; 188/161; 192/1.37; 310/75 D; 310/191
[58] Field of Search ............ 192/1.37; 310/77, 80, 310/191, 209, 261, 75 D, 78; 188/161, 70 R

[56] References Cited

U.S. PATENT DOCUMENTS 1,739,906 12/1929 Klenow .................. 310/93
2,828,429 3/1958 Creonti .................. 310/67 R
4,877,987 10/1989 Flaig et al. .................. 310/209

FOREIGN PATENT DOCUMENTS 3637591 1/1989 Fed. Rep. of Germany .

Primary Examiner—Steven L. Stephan
Assistant Examiner—D. L. Rebsch
Attorney, Agent, or Firm—Horst M. Kasper

[57] ABSTRACT

A displacement armature motor is formed such that the deformation element allows a larger axial shifting and displacement path of the displacement armature while requiring a lower construction precision. The deformation element includes two frames (17, 17a). The frame (17a) is connected via two of its corner attachment positions (17b) to an attachment plate (19). The attachment plate (19) is connected to an extension (31) of the displacement armature. The frame (17) is connected with two of its attachment positions to the carrier arms (15a) of the support ring (15). The two frames (17, 17a) are connected to each other with their respective remaining corner attachment positions (17c) via a transfer element (18).

20 Claims, 2 Drawing Sheets

BRAKE COUPLER FOR DISPLACEMENT-TYPE ARMATURE MOTOR

BACKGROUND OF THE INVENTION

1. Field of the Invention

The invention relates to a displacement-type armature motor comprising a stator and a displacement armature slidable in axial direction relative to the stator against the force of a brake spring, where the displacement armature is connected to a shaft, wherein the shaft is supported in the end shields of a motor casing.

2. Brief Description of the Background of the Invention Including Prior Art

In the context of a displacement-type armature motor of the recited kind and such as, for example, described in German Patent DE-PS 3,637,591, there is furnished a frame-shaped deformation element, which can be composed of individual rods. This single frame of the deformation element limits the shiftability of the shaft in axial direction and requires a very high degree of precision, since the deformation element behaves rigidly against deformation in radial directions and acts as a third bearing support of the displacement armature.

SUMMARY OF THE INVENTION

1. Purpose of the Invention

It is an object of the invention to construct a displacement-type armature motor such that the deformation element allows a larger axial shifting and displacement path of the displacement armature while requiring lower construction precision.

It is a further object of the present invention to provide a displacement-type motor which can be easily maintained and which allows for an easy exchange of the worn elements.

It is yet a further object of the present invention to provide a displacement-type motor, where the armature is safely supported.

These and other objects and advantages of the present invention will become evident from the description which follows.

2. Brief Description of the Invention

The present invention provides for a displacement armature motor having a motor casing with end plates. A shaft is supported in the end plates of the motor casing. A first frame has a first attachment position, a second attachment position, a third attachment position, and fourth attachment position. A support ring includes carrier arms. The first frame is connected with its first attachment position and its second attachment position to the carrier arms of the support ring. A displacement armature is connected to a shaft and has an extension. An attachment plate is connected to the extension of the displacement armature. The displacement armature is axially shiftable relative to a stator against the force of a brake spring. A second frame has a first attachment position, a second attachment position, a third attachment position, and a fourth attachment position. The second frame is connected via the first attachment position and via the second attachment position to the attachment plate. A transfer element connects the first frame and the second frame to each other with the third and fourth attachment position of the respective frame. The first frame and the second frame together with the transfer element form a deformation element.

The displacement armature can be supported on the shaft fixed against rotation via the deformation element attached to the shaft. The deformation element can transfer a rotary torque. The first frame and the second frame of the deformation element can have attachment positions disposed at the edge of the respective frame. These attachment positions of the deformation element can be connected to an extension of the displacement armature or, respectively, to said carrier arms of said support ring.

The transfer element can be furnished at its ends coaxially relative to the third attachment position and relative to the fourth attachment position with spacer shells for rivets and with a center borehole for the passage of the shaft.

Attachment protrusions with attachment boreholes can be furnished at the attachment plate for providing a connection to the second frame. The attachment plate can be furnished with boreholes for bolting means for attachment at the protrusion of the displacement armature next to the straight region of the first frame and of the second frame.

The attachment means can be screws. The screws can be screwed into the spacer tubes and can connect the brake ring and the attachment plate to the extension of the displacement armature.

Rivets can connect the first frame and the second frame to the transfer element, to the attachment plate or to the support ring, respectively.

The third attachment position and the fourth attachment position of the first frame and of the second frame, respectively, can be disposed coaxial relative to each other.

A collar can be disposed at the shaft. A tube can support the displacement armature. A damping element can be disposed between the tube supporting the displacement armature and the collar of the shaft.

The extension of the displacement armature can be furnished with recesses for positioning the carrier arms.

The first frame and the second frame can be furnished with center cutouts having a substantially square shape. The attachment positions can be disposed in the area of the respective corners of the substantially square shape.

A method for mounting a displacement armature in a displacement armature motor comprises the following steps. A shaft is supported in end plates of a motor casing. A displacement armature with an extension is connected to the shaft. The displacement armature is axially shiftable relative to the stator against the force of the brake spring. An attachment plate is connected to the extension of the displacement armature. A second frame is connected via a first attachment position and via a second attachment position to the attachment plate. A transfer element is connected to the second frame via a third attachment position on the second frame and via a forth attachment position on the second frame. A first frame, having a third attachment position and fourth attachment position, is connected with the third and fourth attachment position to the transfer element. The first frame is connected with a first attachment position of the first frame and with a second attachment position of the first frame to carrier arms of a support ring for allowing during operation structural deformation of a deformation element formed by the first frame, the second frame, and the transfer element.

A method for transferring torque between a displacement armature and a shaft comprises the following steps. A rotating shaft is maintained in end plates of a motor casing. Torque is transferred to the shaft from a displacement armature with an extension. The displacement armature is axially shiftable relative to a stator against the force of a brake spring. An attachment plate is rotated based on its attachment to the extension of the displacement armature. A second frame is rotated, where the second frame is attached via a first attachment position and via a second attachment position to the attachment plate. A transfer element is resiliently rotated, where the transfer element is attached to the second frame via a third attachment position on the second frame and via a fourth attachment position on the second frame. A first frame is resiliently rotated, where the first frame has a third attachment position and fourth attachment position and is attached with the third and fourth attachment position to the transfer element. A support ring is resiliently rotated, where the support ring includes carrier arms attached to the first frame via a first attachment position of the first frame and via a second attachment position of the first frame to carrier arms of the support ring.

The invention purpose is achieved by employing a deformation element made of a first frame and a second frame. The second frame is connected to an attachment plate via two of its attachment positions. The attachment plate is connected to an extension of the displacement-type armature. The first frame is connected with its attachment positions to the carrier arms of the support ring. The first and the second frame are connected to each other with their, in each case, remaining attachment positions via a transfer element.

The distribution of the deformation element onto two frames, disposed at a distance determined by the intermediate element, reduces the stroke of each frame to half of the displacement armature stroke between running position and brake position. Thereby, faulty gripping and thus higher displacement forces of the bearing, supporting the displacement armature, are excluded based on the angular movability of the system.

According to a further embodiment, the transfer element comprises spacer shells for rivets and a center bore for the passage of a shaft coaxially disposed at the ends of the transfer element relative to the attachment positions. The attachment plate comprises attachment protrusions with attachment connection bores to the frame, and next to the straight region of the frame, boreholes for screws for attachment of the displacement armature at the extension. The screws connect also the brake ring to the extension of the displacement armature. The exchange of the brake ring is possible without complete release of the brake spring. The disposition of the recesses in the extension of the displacement armature for the carrier arms is selected such that, upon defect and/or breakage of the deformation element, the carrying along is nevertheless performed safe against overvoltage and short circuit.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
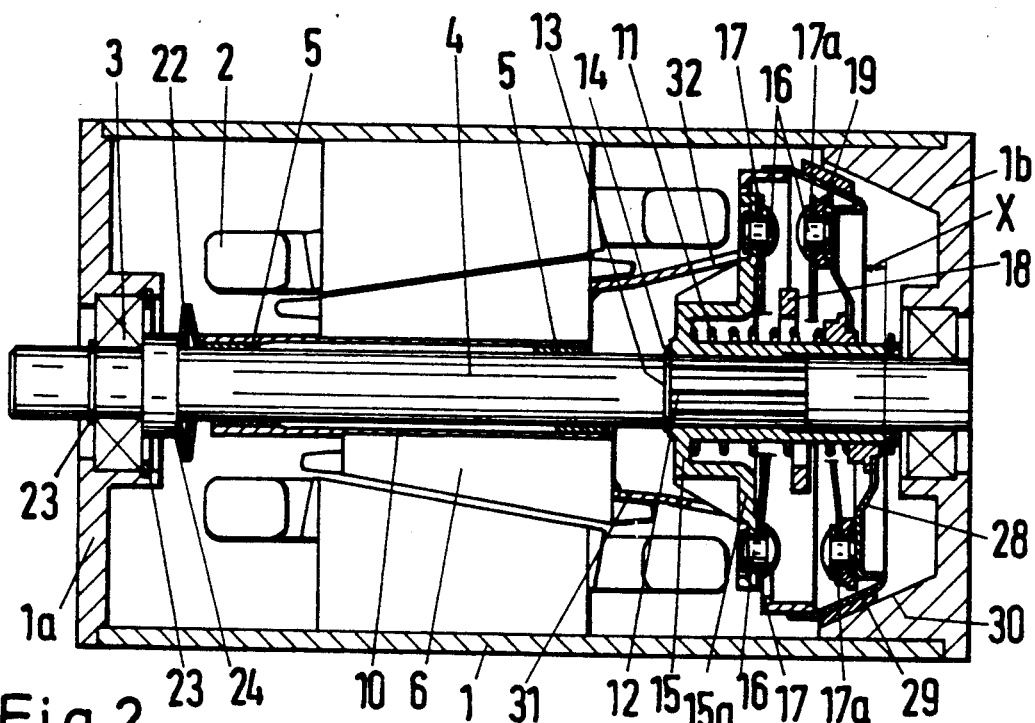
FIG. 1 is a longitudinal sectional view through the displacement-type armature motor, illustrating two positions of the armature.

According to the present invention there is provided a displacement armature motor with a stator and a displacement armature axially shiftable relative to the stator against the force of a brake spring. The displacement armature is connected to a shaft. The shaft is supported in the end plates of a motor casing. The displacement armature is supported on the shaft fixed against rotation via a deformation element attached to the shaft. The deformation element transfers the rotary torque. The deformation element exhibits a frame with attachment positions disposed at the corners of the frame. Two attachment positions are connected to an extension of the displacement armature or, respectively, to carrier arms of a support ring in each case. The deformation element includes a first frame 17 and a second frame 17a. The second frame 17a is connected via two of its attachment positions 17b to an attachment plate 19. The attachment plate 19 is connected to an extension 31 of the displacement armature. The first frame 17 is connected with two of its attachment positions to the carrier arms 15a of the support ring 15. The first frame 17 and the second frame 17a are connected to each other with their, in each case, remaining attachment positions 17c via a transfer element 18.

The transfer element 18 can be furnished at its ends coaxially relative to the attachment positions 17c with spacer shells 18b for rivets 16a and with a center borehole 18a for the passage of the shaft 4.

The attachment plate 19 can include attachment protrusions 19a with attachment boreholes 19b to the second frame 17a. The attachment plate 19 can be furnished with boreholes 19c for screws 20 for attachment at the extension 31 of the displacement armature next to the straight region of the first frame 17 and of the second frame 17a.

The screws 20 can be screwed into spacer tubes 21. The screws 20 can connect the brake ring 28 and the attachment plate 19 to the extension 31 of the displacement armature.

The first frame 17 and the second frame 17a can be connected by way of rivets 16 to the transfer element 18, to the attachment plate 19 or, respectively, to the support ring 15.

The attachment position 17b of the first frame 17 and of the second frame 17a can be disposed coaxial 14 relative to each other.

The damping element 22 can be disposed between a tube 10, supporting the displacement armature, and a collar 24 of the shaft 4.

The extension 31 of the displacement armature can be furnished with recesses 32 for the carrier arms 15a.

Figure 2:
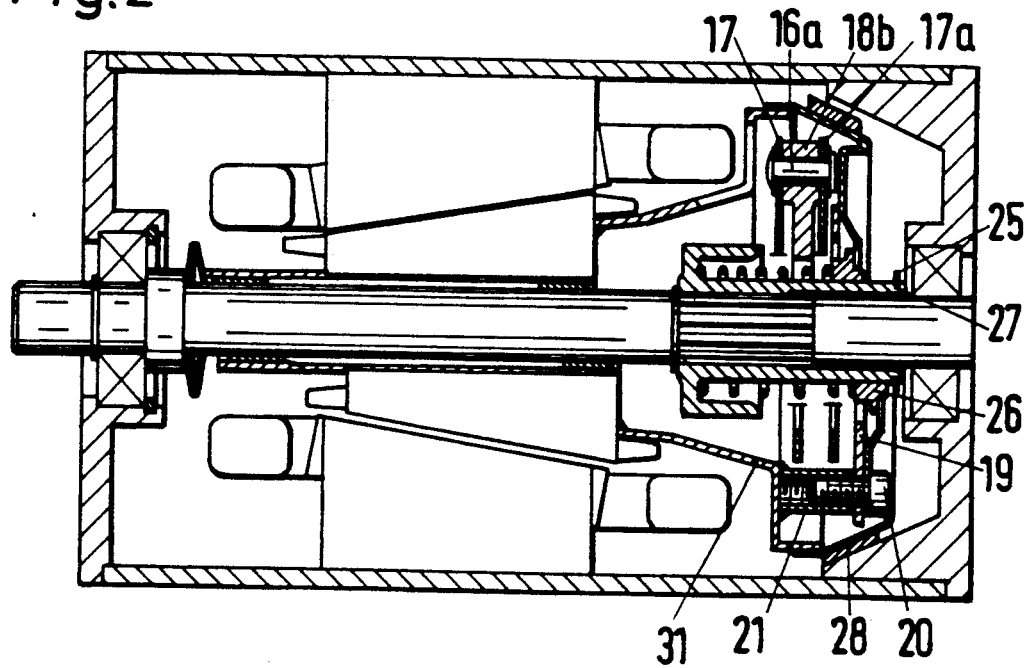
FIG. 2 is a second longitudinal view of the displacement-type armature motor of FIG. 1, illustrating another section through two positions of the armature.
Figure 3:
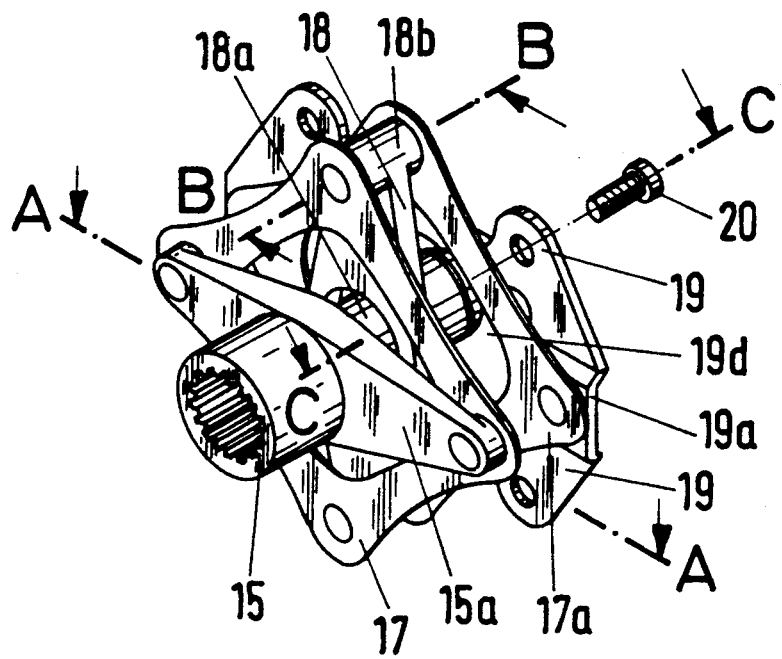
FIG. 3 is a perspective view of the deformation elements associated with the transfer element.
Figure 4:
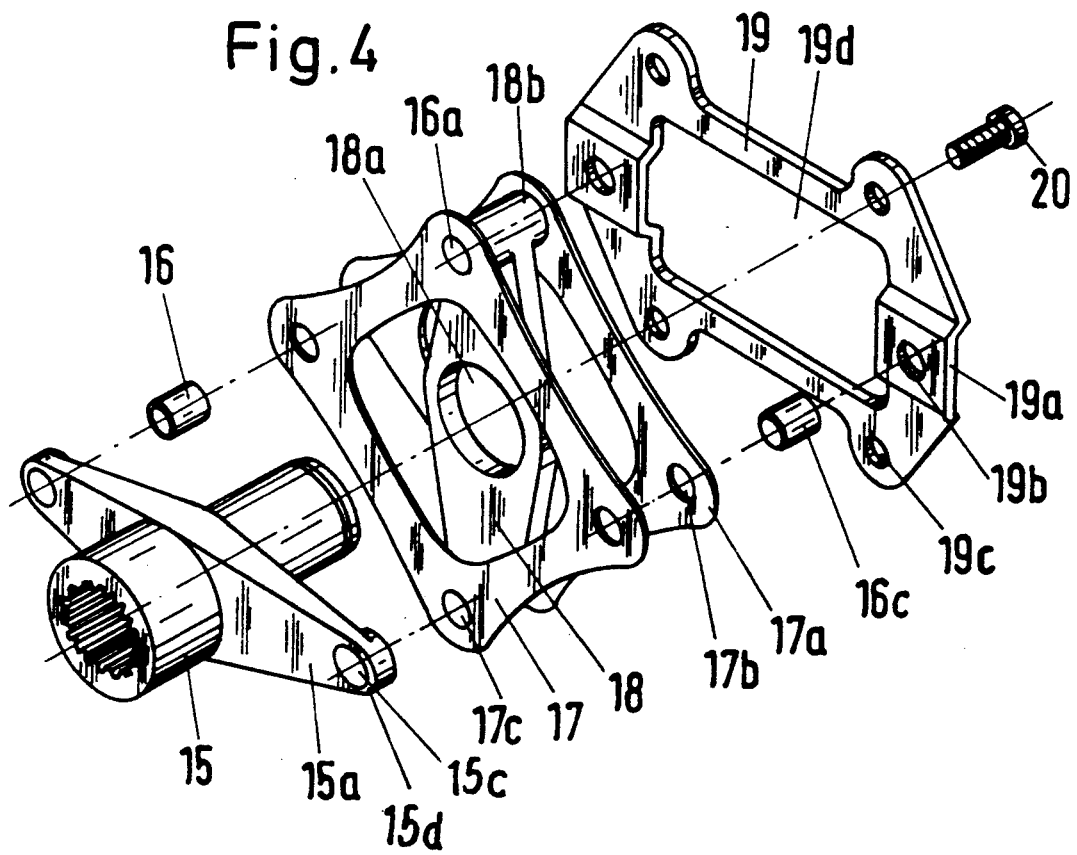
FIG. 4 is an exploded view of the elements illustrated in FIG. 3.

FIG. 1 illustrates the longitudinal section at the section plane A—A in FIG. 3. The illustration shows in the upper half of FIG. 1 the running position and in the lower half of FIG. 1 the brake position. FIG. 2 illustrates the upper half again in the running position and the lower half in brake position. The course of the viewed section is in the upper half in the section plane B—B through the transfer element and in the lower half in the section plane C—C through the screw for the attachment plate 19 to the extension 31 of the displacement armature 6.

The motor casing 1, illustrated in a simplified drawing, includes a stator coil 2. The first front face 1a and the second front face 1b of the motor casing 1 include bearings 3 for a shaft 4. A displacement-type armature 6 can be shifted on the shaft 4 from a brake spring 11 with its brake lining 29 up to a brake face 30, as illustrated in the lower half of FIG. 1. The displacement armature 6 is attached to a tube 10 and is shifted by way of bearing bushings 5 on the shaft 4. The brake lining 29 is attached to a brake ring 28 and is connected with the extension 31 of the displacement armature 6, as can be recognized in the lower half of FIG. 2.

The shaft 4 exhibits, in the region of the brake spring 11, a toothing 12 and an annular groove 13 for a cracking ring 14. A support ring 15, rotating with the shaft 4, is supported at the cracking ring 14 via the toothing 12. The support ring 15 is constructed for receiving the brake spring 11 as a double-jacket ring. As illustrated in FIGS. 1 and 3, the support ring 15 includes carrier arms 15a with boreholes for the rivets 16 for the attachment of the first frame 17, also recognizable in FIG. 3, of the deformation element at the support ring 15. When comparing the upper half of FIG. 1 with the lower half of FIG. 1, it is recognized that the carrier arms 15a are not connected to the extension 31.

It can be recognized in all figures that a second frame 17a is coordinated to the first frame 17 on the other side of a transfer element 18. The transfer element 18 includes at the ends spacer shells 18b for rivets 16. The rivets 16 connect the two frames 17 and 17a with each other at two edges disposed opposite to each other. In addition, the transfer element 18 comprises a center bore 18a for the passage of the brake spring 11. The frame 17, disposed on the displacement armature side, is connected to the carrier arm 15a of the support ring 15 by way of rivets 16. The second frame 17a, disposed on the brake side, is attached at the attachment protrusions 19a of an attachment plate 19 by way of further rivets 16c disposed coaxially relative to a rivets 16. The attachment protrusions 19a allow the free deformation of the second frame 17a in the running position and they create space for the head of the rivet 16c. The attachment plate 19 is furnished with a center breakout 19d for the brake spring 11 and with four boreholes 19c for screws 20. The screws or bolts 20 are screwed into the spacer tubes 21 of the extension 31. Thereby, the brake ring 28 is also connected to this extension 31, as illustrated in the lower half of FIG. 2.

The measure distance X in FIG. 1 corresponds to the stroke of the displacement armature between the running position (FIG. 1, upper half) and the brake position (FIG. 1, lower half).

The displacement-type armature motor is illustrated in FIGS. 1 and 2 in the upper half in running position and the frames 17 and 17a of the deformation element are deformed in each case by about X/4 in the region between the attachment position to the transfer element 18 and the attachment position to the carrier arms 15a or, respectively, to the attachment plate 19. In the brake position according to the lower half in FIG. 1, the attachment plate 19 is shifted with the brake ring 28 up to the rest position of the brake lining 29 at the brake face 30 and the frames 17 and 17a, in each case, are deformed by about X/4 opposite to their running position. The deformation becomes possible via the rivets 16 and the inherent flexibility and elasticity of the frames 17, 17a.

The displacement armature 6 is supported with a tube 10 and bearing bushes 5 on the shaft 4. For the damping of the impact force, the tube 10 of the displacement armature 6 rests, in running position, via an elastic damping element 22, for example shaped as a spring washer, at a collar 24 of the shaft 4. The shaft 4 is axially fixed in its position in the casing 1 via the already recited support bearing 3 and the cracking rings 23.

The exchange of the brake ring 28 can be performed without complete release of the brake spring 11, in that the brake spring 11 is supported during the release of the screws 20 with an intermediate ring 26 and by supporting this intermediate ring 26 via a securing ring 25. The securing ring 25 engages into a groove 27 of the support ring 15. In this case, the free distance for the displacement path of the intermediate ring 26 is so large that even in case of an extremely high brake-lining wear, the free distance available is not fully used, and that, in this situation, the pull-in force for the displacement armature 6 is not sufficient to put the displacement armature 6 into running position, such that the displacement armature 6 is retained safely by the brake and cannot start.

A radial elasticity is achieved by the disposition of the axially elastic frames 17 and 17a of the deformation element such that the bearing bushes 5 supporting the displacement armature 6 cannot be tensioned. The high torsional rigidity and stiffness and freedom of play of the riveted moment transfer system, according to FIG. 3, prevents excessive load levels, in particular in case of a reversing operation. No servicing is required; the functional behavior is not influenced by temperature or brake dust.

The carrier arms 15a of the support ring 15 protrude, during the running position and the brake position, into the recesses 32 of the extension 31 of the displacement armature 6 such that, even in case of a problem with the frames 17, 17a, there is assured a torque transfer between the shaft 4 and the displacement armature 6 that is puncture-proof and secure against possible mechanical problems.

The support ring 15 can have carrier arms 15a which are substantially tangentially surrounding the support ring 15 and the borehole rings 15d surrounding the boreholes 15c for attaching the first frame 17 and disposed at the respective ends of the carrier arms 15a. The transfer element 18 can be formed for its attachment to the second frame 17a similar to the carrier arms 15a of the support ring 15. However, the transfer element 18 has furnished tubular sections 18b instead of simple boreholes at respective ends of a flat, elongated piece of material. The tubular sections 18b serve as spacers between the frames 17 and 17a. The frames 17 and 17a and the attachment plate 19, as well as the transfer element 18 and the support ring 15 with the carrier arms 15a can be made of a metal or plastic. Preferably, the elements are punched sheet metal or molded plastic elements. The direction of the carrier arms 15a is preferably rotated by 90 degrees versus the longitudinal extension of the transfer element 18. The attachment positions between the second frame 17a and the attachment plate 19 are preferably coaxial to the rivets 16 between the first frame 17 and the carrier arm 15a. Preferably, the first frame 17 and the second frame 17a are of a substantially square shape and have a substantially square center opening which has distances between sides which correspond to 0.4 to 0.9, and preferably from about 0.6 to 0.8, times the distances of respective outer sides of the first frame 17 or the second frame 17a. The attachment plate 19 similarly comprises a substantially rectangular center opening which has distances between opposed sides corresponding to 0.5 to 1.1 times the distances of boreholes 19b in the attachment plate 19 for attachment to the second frame 17. As the substantially rectangular openings of the first frame 17 and of the second frame 17a are configurationally aligned such that their projection along the motor axis coincides, the rectangular opening of the attachment plate 19 is rotated by an angle of from about 35 to 55 degrees in its position relative to the first frame 17. The attachment plate 19 is preferably elongated in a direction which is parallel to the connection line between the respective two boreholes of the first frame 17 connected to the attachment plate 19. The attachment protrusion 19a in the area of the attachment plate 19 toward the second frame 17a can be from about 1 to 5 times the thickness of the attachment plate 19. The size of the protrusion 19a can be equal to the width of the attachment plate 19 in a radial direction and can be from about 0.8 to 1.5 times the width of the attachment plate 19 in radial direction as seen in a direction perpendicular to said radial direction. The distance between the boreholes of the first frame 17 and of the second plate 17a relative to the distance between the borehole of the second frame 17a to the attachment plate 19 can be from about 1.5 to 3 times, and preferably from about 1.8 to 2.5 times, the distance between the protrusion 19a of the attachment plate 19 and the respective borehole 17b in the second frame 17a. The distance between the carrier arms 15a and the first frame 17 can be from about 0.5 to 2.0 times, and preferably from about 0.8 to 1.2 times, the distance between the protrusion 19a on the attachment plate 19 and the second frame 17a in assembled position. The diametrical distance between the boreholes 17c in the first frame 17 and, respectively, the second frame 17a, which serve to connect the first frame 17 and the second frame 17a, can be from about 3 to 10 times, and is preferably 4 to 6 times, the distance between the first frame 17 and the second frame 17a. The center section of the transfer element 18 is preferably disposed substantially at a middle position relative to the first frame 17 and the second frame 17a.

It will be understood that each of the elements described above, or two or more together, may also find a useful application in other types of armature motors differing from the types described above.

While the invention has been illustrated and described as embodied in the context of a displacement-type armature motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A displacement armature motor comprising
   a motor casing having end plates;
   a shaft supported in the end plates of the motor casing; a first frame having a first attachment position, a second attachment position, a third attachment position, and fourth attachment position;
   a support ring including carrier arms, wherein the first frame is connected with its first attachment position and its second attachment position to the carrier arms of the support ring;
   an attachment plate;
   a stator;
   a brake spring;
   a displacement armature connected to a shaft and having an extension, wherein the attachment plate is connected to the extension of the displacement armature and wherein the displacement armature is axially shiftable relative to the stator against the force of the brake spring;
   a second frame having a first attachment position, a second attachment position, a third attachment position, and a fourth attachment position, wherein the second frame is connected via the first attachment position and via the second attachment position to the attachment plate;
   a transfer element connecting the first frame and the second frame to each other with the third and fourth attachment position of the respective frame, and wherein the first frame and the second frame together with the transfer element form a deformation element.

2. The displacement armature motor according to claim 1, wherein
   the displacement armature is supported on the shaft fixed against rotation via the deformation element attached to the shaft, wherein the deformation element transfers a rotary torque, wherein the first frame and the second frame of the deformation element have attachment positions disposed at corners of the respective frame, and wherein these attachment positions of the deformation element are connected to an extension of the displacement armature or, respectively, to said carrier arms of said support ring.

3. The displacement armature motor according to claim 1, further comprising
   spacer shells for rivets, wherein the transfer element is furnished at its ends coaxially relative to the third attachment position and relative to the fourth attachment position with the spacer shells for rivets and with a center borehole for the passage of the shaft.

4. The displacement armature motor according to claim 1, further comprising
   attachment protrusions with attachment boreholes furnished at the attachment plate for providing a connection to the second frame, and wherein the attachment plate is furnished with boreholes for bolting means for attachment at the protrusion of the displacement armature next to the straight region of the first frame and of the second frame.

5. The displacement armature motor according to claim 4 further comprising
   spacer tubes, wherein the attachment means are screws, which screws are screwed into the spacer tubes, and where the screws connect the brake ring and the attachment plate to the extension of the displacement armature.

6. The displacement armature motor according to claim 1, further comprising
rivets, wherein the rivets connect the first frame and the second frame to the transfer element, to the attachment plate, or to the support ring, respectively.

7. The displacement armature motor, according to claim 1, wherein
the third attachment position and the fourth attachment position of the first frame and of the second frame, respectively, are disposed coaxial relative to each other.

8. The displacement armature motor, according to claim 1, further comprising
a collar disposed at the shaft;
a tube supporting the displacement armature;
a damping element is disposed between the tube supporting the displacement armature and the collar of the shaft.

9. The displacement armature motor, according to claim 1, wherein
the extension of the displacement armature is furnished with recesses for positioning the carrier arms.

10. The displacement armature motor, according to claim 1, wherein the first frame and the second frame are furnished with center cutouts having a substantially square shape, and wherein the attachment positions are disposed in the area of the respective corners of the substantially square shape.

11. A displacement armature motor with a stator and a displacement armature axially shiftable relative to the stator against the force of a brake spring, which displacement armature is connected to a shaft, wherein the shaft is supported in the end plates of a motor casing, and where the displacement armature is supported on the shaft fixed against rotation via a deformation element attached to the shaft, which deformation element transfers the rotary torque, where the deformation element exhibits a frame with attachment positions disposed at corners of the frame, wherein a first one of said attachment positions is connected to an extension of the displacement armature and wherein a second one of said attachment positions is connected to carrier arms of a support ring, wherein the deformation element includes a first frame (17) and a second frame (17a), of which the second frame (17a) is connected via two of its attachment positions (17b) to an attachment plate (19), where the attachment plate (19) is connected to an extension (31) of the displacement armature, and wherein the first frame (17) is connected with two of its attachment positions to the carrier arms (15a) of the support ring (15), and where the first frame (17) and the second frame (17a) are connected to each other with their, in each case, remaining attachment positions (17c) via a transfer element (18).

12. The displacement armature motor according to claim 11, wherein
the transfer element (18) is furnished at its ends coaxially relative to the attachment positions (17c) with spacer shells (18b) for rivets (16a) and with a center borehole (18a) for the passage of the shaft (4).

13. The displacement armature motor according to claim 11, wherein
the attachment plate (19) includes attachment protrusions (19a) with attachment boreholes (19b) to the second frame (17a), and where the attachment plate (19) is furnished with boreholes (19c) for screws (20) for attachment at the extension (31) of the displacement armature next to the straight region of the first frame (17) and of the second frame (17a).

14. The displacement armature motor according to claim 13, wherein
the screws (20) are screwed into spacer tubes (21), and where the screws (20) connect the brake ring (28) and the attachment plate (19) to the extension (31) of the displacement armature.

15. The displacement armature motor according to claim 11, wherein
the first frame (17) and the second frame (17a) are connected by way of rivets (16) to the transfer element (18), to the attachment plate (19) or, respectively, to the support ring (15).

16. The displacement armature motor, according to claim 11, wherein
the attachment position (17b) of the first frame (17) and of the second frame (17a) are disposed coaxial relative to each other.

17. The displacement armature motor, according to claim 11, wherein
a damping element (22) is disposed between a tube (10), supporting the displacement armature, and a collar (24) of the shaft (4).

18. The displacement armature motor, according to claim 11, wherein the extension (31) of the displacement armature is furnished with recesses (32) for the carrier arms (15a).

19. A method for mounting a displacement armature in a displacement armature motor comprising
supporting a shaft in end plates of a motor casing;
connecting a displacement armature with an extension to the shaft, wherein the displacement armature is axially shiftable relative to the stator against the force of the brake spring;
connecting an attachment plate to the extension of the displacement armature;
connecting a second frame via a first attachment position and via a second attachment position to the attachment plate;
connecting a transfer element to the second frame via a third attachment position on the second frame and via a forth attachment position on the second frame; connecting a first frame, having a third attachment position and fourth attachment position, with the third and fourth attachment position to the transfer element;
connecting the first frame with a first attachment position of the first frame and with a second attachment position of the first frame to carrier arms of a support ring for allowing during operation structural deformation of a deformation element formed by the first frame, the second frame, and the transfer element.

20. A method for transferring torque between a displacement armature and a shaft comprising
maintaining a rotating shaft in end plates of a motor casing;
transferring torque to the shaft from a displacement armature with an extension, wherein the displacement armature is axially shiftable relative to a stator against the force of a brake spring;
rotating an attachment plate based on its attachment to the extension of the displacement armature;
rotating a second frame attached via a first attachment position and via a second attachment position to the attachment plate; resiliently rotating a transfer element attached to the second frame via a third attachment position on the second frame and via a fourth attachment position on the second frame; resiliently rotating a first frame having a third attachment position and fourth attachment position and attached with the third and fourth attachment position to the transfer element;

resiliently rotating a support ring including carrier arms attached to the first frame via a first attachment position of the first frame and via a second attachment position of the first frame to carrier arms of the support ring.

* * * * *